United States Patent
Hamamoto et al.

(10) Patent No.: US 11,623,180 B2
(45) Date of Patent: Apr. 11, 2023

(54) CATALYTIC CONVERTER

(71) Applicants: NISSAN MOTOR CO., LTD., Yokohama (JP); RENAULT S.A.S., Boulogne-Billancourt (FR)

(72) Inventors: Takayuki Hamamoto, Kanagawa (JP); Hirofumi Tsuchida, Kanagawa (JP); Daisuke Takaki, Kanagawa (JP); Yuta Ishigaki, Kanagawa (JP)

(73) Assignees: NISSAN MOTOR CO., LTD., Yokohama (JP); RENAULT S. A. S., Boulogne-Billancourt (FR)

( * ) Notice: Subject to any disclaimer, the term of this patent is extended or adjusted under 35 U.S.C. 154(b) by 0 days.

(21) Appl. No.: 17/612,769

(22) PCT Filed: May 22, 2019

(86) PCT No.: PCT/IB2019/000566
§ 371 (c)(1),
(2) Date: Nov. 19, 2021

(87) PCT Pub. No.: WO2020/234618
PCT Pub. Date: Nov. 26, 2020

(65) Prior Publication Data
US 2022/0274060 A1  Sep. 1, 2022

(51) Int. Cl.
*F01N 3/022* (2006.01)
*B01D 53/94* (2006.01)
(Continued)

(52) U.S. Cl.
CPC ....... *B01D 53/9454* (2013.01); *B01D 53/945* (2013.01); *F01N 3/0222* (2013.01);
(Continued)

(58) Field of Classification Search
CPC ........... B01D 53/945; B01D 2255/915; F01N 3/0222; F01N 3/2013; F01N 2470/08; F01N 2470/18; F01N 3/035; F01N 13/0097
(Continued)

(56) References Cited

U.S. PATENT DOCUMENTS 4,775,518 A * 10/1988 Abthoff ................. F01N 3/2864
422/177
5,693,295 A * 12/1997 Foster ................. F01N 13/0097
422/177
(Continued)

FOREIGN PATENT DOCUMENTS

DE   10 2015 107 083 A1   11/2015
DE   10 2016 114 283 A1    2/2018
(Continued)

*Primary Examiner* — Tom P Duong
(74) *Attorney, Agent, or Firm* — Foley & Lardner LLP

(57) ABSTRACT

A catalytic converter is provided with: an inlet-side diffuser part; an outlet-side diffuser part; a case including an upstream-side cylindrical part and a downstream-side cylindrical part; an inner liner provided in the upstream-side cylindrical part; a first catalyst retained inside the inner liner; and a second catalyst retained inside the downstream-side cylindrical part. An end face of the second catalyst faces a peripheral surface of the inner liner. An annular flow path is provided between the upstream-side cylindrical part and the inner liner, and the first catalyst is insulated from heat by the annular flow path. A part of exhaust flows into the second catalyst via the annular flow path.

5 Claims, 7 Drawing Sheets

(51) Int. Cl.
 *F01N 3/20* (2006.01)
 *F01N 3/28* (2006.01)
(52) U.S. Cl.
 CPC ......... *F01N 3/2013* (2013.01); *F01N 3/2825* (2013.01); *B01D 2255/915* (2013.01)
(58) Field of Classification Search
 USPC .................................................. 422/177, 180
 See application file for complete search history.

(56) References Cited

U.S. PATENT DOCUMENTS

| | | | |
|---|---|---|---|
| 6,713,025 B1* | 3/2004 | Ivanescu | F01N 13/1805 422/177 |
| 2012/0198838 A1* | 8/2012 | Bruck | F01N 13/1805 55/482 |
| 2015/0178215 A1* | 6/2015 | Henry | G11C 17/16 711/125 |
| 2015/0330279 A1 | 11/2015 | Melecosky | |
| 2015/0377110 A1* | 12/2015 | Sandberg | F01N 13/009 422/171 |
| 2018/0258826 A1* | 9/2018 | Kuramashi | F01N 3/10 |
| 2020/0032685 A1 | 1/2020 | Kuramashi et al. | |

FOREIGN PATENT DOCUMENTS

| | | |
|---|---|---|
| JP | 7-25212 U | 5/1995 |
| JP | 2011-117409 A | 6/2011 |
| JP | 2015-98834 A | 5/2015 |
| JP | 2018-96345 A | 6/2018 |

\* cited by examiner

CATALYTIC CONVERTER

TECHNICAL FIELD

The present invention relates to a catalytic converter for exhaust purification in an internal combustion engine.

BACKGROUND ART

The exhaust purification in an internal combustion engine for automobile may be performed by, for example, disposing a catalytic converter employing a catalyst material such as a three-way catalyst and an oxidation catalyst, on a way in an exhaust passage. It is known that such catalytic converter may include a pair of catalyst carriers arranged perpendicularly to each other, i.e. arranged in a substantially L-shape, in view of restriction in space in an engine room.

Patent Document 1 discloses a catalytic converter including a first catalyst disposed in an upstream side and a second catalyst disposed in a downstream side, wherein these two catalyst carriers are positioned such that a peripheral face of the first catalyst partially overlaps with an end face of the second catalyst, and wherein the catalytic converter further includes an exhaust outlet disposed to face a terminal end of the second catalyst and positioned with a shift toward the overlapping part in which the second catalyst overlaps with the first catalyst.

Recent hybrid vehicles are, for example, configured to often stop their internal combustion engines during vehicle traveling, and are therefore likely to undergo a problem of temporary deterioration in exhaust composition upon engine restart, due to temperature fall in catalysts receiving vehicle traveling wind. On the other hand, the catalysts undergo thermal deterioration in case of excessive rise in catalyst temperature due to continuous operation of the internal combustion engines.

Patent Document 1 includes no disclosure with regard to heat retaining for the catalysts and avoidance of the excessive temperature rise in the catalysts.

Furthermore, Patent Document 1 has a difficulty in compatibility between smoothing of exhaust flow from the first catalyst to the second catalyst and downsizing in external dimension, because the catalytic converter of Patent Document 1 is structured to allow exhaust to flow from the first catalyst to an inlet-side end face of the second catalyst in the overlapping part, by shaping a case to include a local bulge facing an outlet-side end face of the first catalyst.

PRIOR ART DOCUMENT(S)

Patent Document(s)

Patent Document 1: JP 2018-96345 A

SUMMARY OF THE INVENTION

According to one aspect of the present invention, a catalytic converter includes: an inlet-side diffuser and an outlet-side diffuser that are arranged to extend perpendicularly to each other; a case including an upstream-side cylindrical section and a downstream-side cylindrical section, wherein: the upstream-side cylindrical section includes a first end continuous with the inlet-side diffuser; the downstream-side cylindrical section includes a first end continuous with the outlet-side diffuser; the upstream-side cylindrical section has a central axis perpendicular to a central axis of the downstream-side cylindrical section; the upstream-side cylindrical section includes a peripheral face that includes in a circumferential direction thereof a first part continuous with an edge of a second end of the downstream-side cylindrical section, wherein the first part is positioned in a second end of the upstream-side cylindrical section; and the peripheral face of the upstream-side cylindrical section except for the first part is continuous with the downstream-side cylindrical section via a bottom wall; an inner liner including a first end fixed to an upstream-side edge of the upstream-side cylindrical section and a second end structured as a free end open inside the case toward the bottom wall, wherein the inner liner and the upstream-side cylindrical section define therebetween a gap serving as a flow passage and compose a double pipe structure; an upstream-side ceramic member that has a columnar shape, and serves as a catalyst carrier or a particulate collection filter, and is retained inside the inner liner; a downstream-side ceramic member that has a columnar shape, and serves as a catalyst carrier or a particulate collection filter, and is retained inside the downstream-side cylindrical section, wherein the downstream-side ceramic member includes an upstream-side end face facing a peripheral face of the inner liner such that a half or more in diameter of the upstream-side end face overlaps with the peripheral face of the inner liner; supporters that are circumferentially arranged around the end of the inner liner, wherein each of the supporters is heat conductive and is interposed between the inner liner and the upstream-side cylindrical section; and a catalytic material carried by the upstream-side ceramic member or the downstream-side ceramic member.

According to the above configurations, the upstream-side ceramic member is positioned inside the double pipe structure composed of the upstream-side cylindrical section and the inner liner of the case, wherein the upstream-side cylindrical section and the inner liner have the gap therebetween. This serves for thermal insulation and heat retaining of the upstream-side ceramic member, against cooling effect exerted on the case from outside air and/or vehicle traveling wind, and thereby relax temperature fall due to the vehicle traveling wind.

Exhaust gas discharged from a downstream-side end face of the upstream-side ceramic member flows through the flow passage composed of the gap between the upstream-side cylindrical section and the inner liner, and then flows toward an upstream-side end face of the downstream-side cylindrical section. The flow passage composed of the gap is allowed to have an enough flow passage cross sectional area, without extremely increasing the upstream-side cylindrical section in diameter. Furthermore, the flow passage allows the exhaust gas to smoothly flow helically along an inner peripheral surface of the upstream-side cylindrical section, even in case that the half or more in diameter of the upstream-side end face overlaps with the peripheral face of the inner liner. These serve to establish compatibility between smoothing in flow of exhaust gas and downsizing in external dimension.

MODE(S) FOR CARRYING OUT THE INVENTION

The following details a first embodiment of the present invention, with reference to the drawings.

Figure 1:
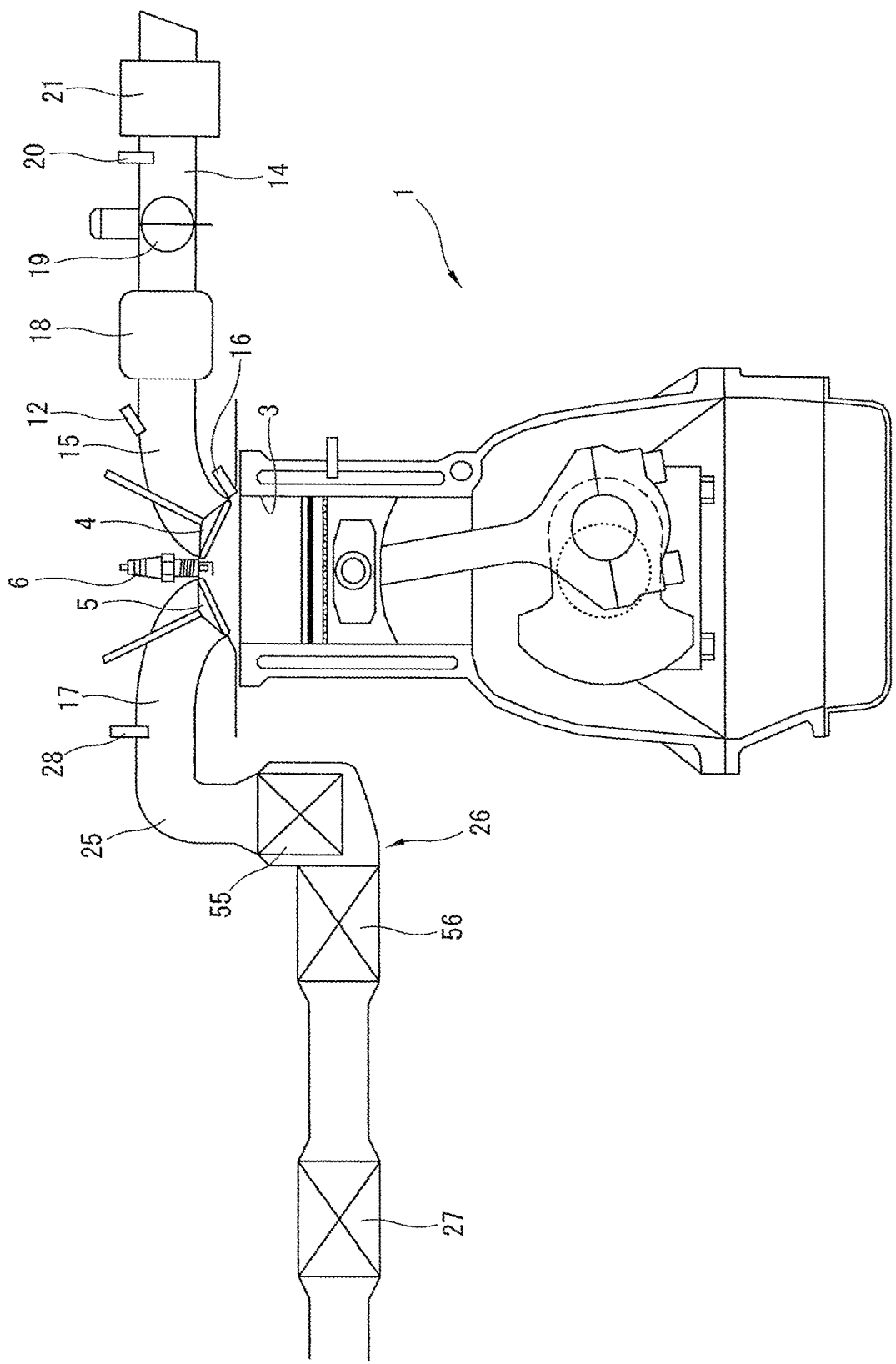
FIG. 1 is a schematic view showing configurations of an internal combustion engine employing a catalytic converter according to a first embodiment.

FIG. 1 illustrates configurations of an internal combustion engine 1 for vehicle which employs a catalytic converter according to the first embodiment. According to the first embodiment, the present invention is applied to the catalytic converter used in the internal combustion engine for generation to drive a generator of a series hybrid vehicle. Internal combustion engine 1 in the series hybrid vehicle is operated intermittently depending on generation request from the vehicle. The present invention is applicable not only to an internal combustion engine for a series hybrid vehicle, but also to an internal combustion engine for a parallel hybrid vehicle or simply an internal combustion engine for a vehicle structured to travel by output from the internal combustion engine.

Internal combustion engine 1 is, for example, a four-stroke cycle spark ignition type internal combustion engine. Internal combustion engine 1 includes a pair of intake valves 4 and a pair of exhaust valves 5 in a ceiling wall of a combustion chamber 3, and includes a spark plug 6 in a central region surrounded by intake valves 4 and exhaust valves 5.

Intake valves 4 are structured to open and close an intake port 15 below which a cylinder-injection fuel injection valve 16 is disposed. Cylinder-injection fuel injection valve 16 serves as a main fuel injection valve, and is structured to inject fuel directly into combustion chamber 3. Intake port 15 includes a port-injection fuel injection valve 12 for each cylinder. Port-injection fuel injection valve 12 is structured to inject fuel into intake port 15 and serve as a supplementary fuel injection valve to be operated under specific conditions. Each of cylinder-injection fuel injection valve 16 and port-injection fuel injection valve 12 is an electromagnetic or piezoelectric type injection valve structured to open in response to application of a drive pulse signal and inject fuel substantially proportional in amount to a pulse width of the drive pulse signal. In addition, one of cylinder-injection fuel injection valve 16 and port-injection fuel injection valve 12 may be omitted in case of avoiding such dual injection system.

Intake port 15 is connected to an intake passage 14 that includes a collector 18 and an electronically controlled throttle valve 19 installed upstream with respect to collector 18. Throttle valve 19 has an opening degree controlled with a control signal from an engine controller not shown. Intake passage 14 further includes an air flow meter 20 structured to measure an amount of intake air and disposed upstream with respect to throttle valve 19, and includes an air cleaner 21 disposed upstream with respect to air flow meter 20.

An exhaust port 17 is connected to an exhaust passage 25 that includes a preparatory catalytic converter 26 according to the first embodiment of the present invention and a main catalytic converter 27 disposed downstream with respect to preparatory catalytic converter 26. Upstream with respect to preparatory catalytic converter 26, an air-fuel ratio sensor 28 structured to measure an air-fuel ratio is disposed. Preparatory catalytic converter 26 is located at a relatively upstream position in the exhaust system, and is contained in an engine room of the vehicle. Main catalytic converter 27 is located under a floor of the vehicle.

Figure 2:
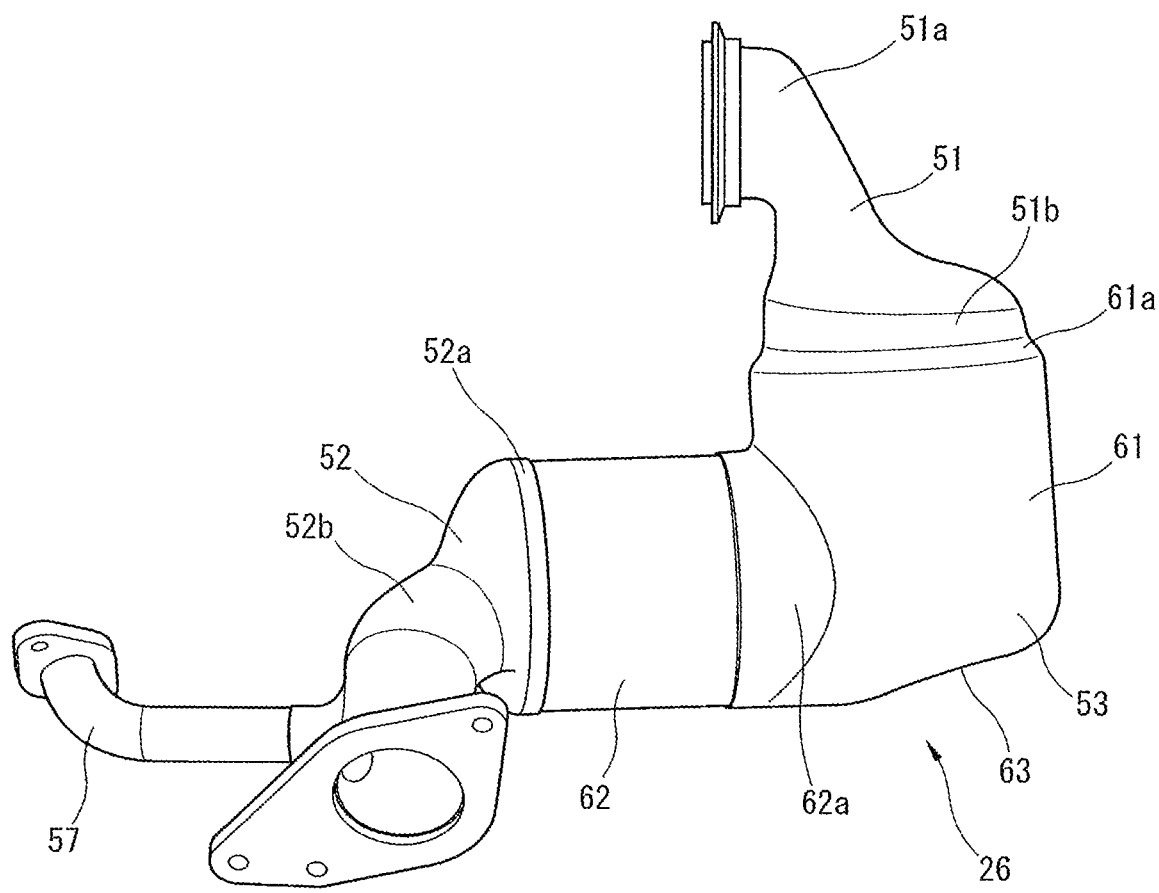
FIG. 2 is a side view of the catalytic converter according to the first embodiment.
Figure 3:
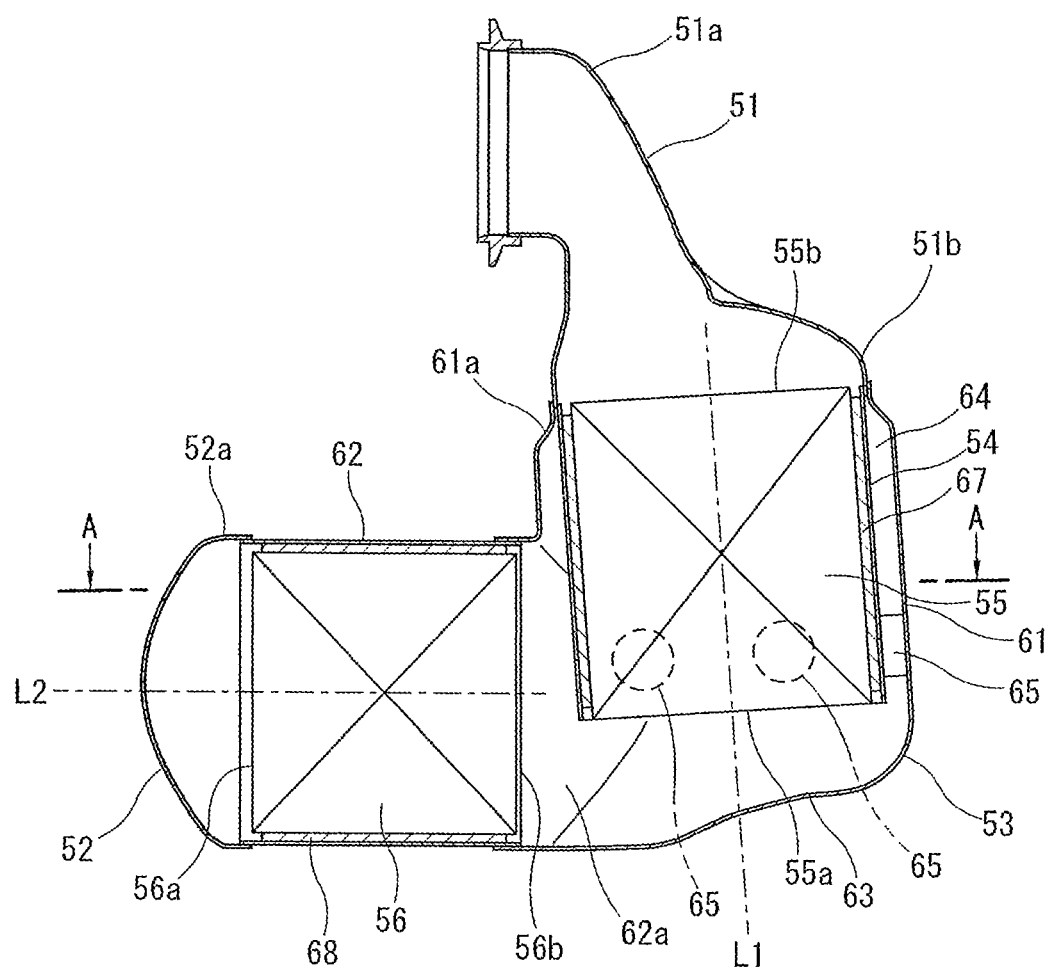
FIG. 3 is a longitudinal sectional view of the catalytic converter.

FIG. 2 is a side view of preparatory catalytic converter 26, which is simply referred to as catalytic converter 26 in the following, according to the first embodiment. FIG. 3 is a longitudinal sectional view showing an internal structure of catalytic converter 26. As shown in these drawings, catalytic converter 26 includes: an inlet-side diffuser 51 connected to an upstream-side exhaust passage such as an outlet of a collection part of an exhaust manifold; an outlet-side diffuser 52 connected to a downstream-side exhaust passage; a case 53 interposed between inlet-side diffuser 51 and outlet-side diffuser 52; an inner liner 54 disposed to form a double pipe structure in a region inside the case 53; and a first catalyst 55 and a second catalyst 56 each of which has a columnar shape and is disposed inside the case 53.

Inlet-side diffuser 51 includes an exhaust pipe 51a and a circular wide diameter section 51b greater in diameter than exhaust pipe 51a, and is tapered to increase in diameter from exhaust pipe 51a to wide diameter section 51b. Contrarily, outlet-side diffuser 52 includes a circular wide diameter section 52a and an exhaust pipe 52b, and is tapered to decrease in diameter from wide diameter section 52a to exhaust pipe 52b. As shown in FIG. 2, exhaust pipe 52b is connected to a branch pipe 57 for an EGR passage.

Wide diameter section 51b of inlet-side diffuser 51 and wide diameter section 52a of outlet-side diffuser 52 are substantially equal to each other in diameter, and are disposed perpendicularly to each other.

Case 53 connects inlet-side diffuser 51 to outlet-side diffuser 52, and is bent a substantially L-shape. In detail, case 53 includes an upstream-side cylindrical section 61 having a cylindrical shape and including a first end formed continuously with wide diameter section 51b of inlet-side diffuser 51, and includes a downstream-side cylindrical section 62 having a cylindrical shape and including a first end formed continuously with wide diameter section 52a of outlet-side diffuser 52, wherein a central axis L1 of upstream-side cylindrical section 61 and a central axis L2 of downstream-side cylindrical section 62 are perpendicular to each other. In the present disclosure, the meaning of "perpendicular" is not limited to a case of geometrically strict 90°, and includes cases of approximately 85° to 95°. Upstream-side cylindrical section 61 and downstream-side cylindrical section 62 are combined in the L-shape, where: upstream-side cylindrical section 61 includes a second end opposite to inlet-side diffuser 51; downstream-side cylindrical section 62 includes a second end opposite to outlet-side diffuser 52; the second end of upstream-side cylindrical section 61 includes a peripheral face including a part in a circumferential direction around upstream-side cylindrical section 61 wherein the part is continuous with the second end of downstream-side cylindrical section 62 via a pair of crescent portions 62a.

Upstream-side cylindrical section 61 is slightly greater in diameter than wide diameter section 51b of inlet-side diffuser 51, and is connected to inlet-side diffuser 51 via a taper section 61a having an annular shape. Downstream-side cylindrical section 62 is substantially equal in diameter to wide diameter section 52a of outlet-side diffuser 52, and includes the first end extending straight to be connected to outlet-side diffuser 52. Accordingly, upstream-side cylindrical section 61 is slightly greater in diameter than downstream-side cylindrical section 62, and each of crescent portions 62a is connected to upstream-side cylindrical section 61 so as to occupy an angle less than 180° in the peripheral face of upstream-side cylindrical section 61. The second end of upstream-side cylindrical section 61 opposite to inlet-side diffuser 51 is closed by a bottom wall 63 obliquely crossing the central axis L1. In other words, the peripheral face of the second end of upstream-side cylindrical section 61 is smoothly continuous with downstream-side cylindrical section 62 via bottom wall 63, except for regions occupied by crescent portions 62a.

Case 53 exemplified in the drawings is formed by assembling separate components: i.e., the straight part of downstream-side cylindrical section 62, and a part including upstream-side cylindrical section 61 and crescent portions 62a. However, case 53 is not limited to an assembly of appropriately separated components, but may be an integrated single component.

Inner liner 54 has a cylindrical shape in conformance in diameter with wide diameter section 51b of inlet-side diffuser 51, and includes a first end fixed to and supported by the upstream-side end of upstream-side cylindrical section 61 of case 53. In detail, the first end of inner liner 54 is fixed to a narrow diameter sided end of taper section 61a which is connected to wide diameter section 51b of inlet-side diffuser 51. Although FIG. 3 exemplarily shows that wide diameter section 51b of inlet-side diffuser 51 overlaps with an inner peripheral surface of taper section 61a, and the first end of inner liner 54 overlaps with an inner peripheral surface of inlet-side diffuser 51, these three members are not limited in how to overlap them. Furthermore, it is allowed, for example, to form inlet-side diffuser 51 and upstream-side cylindrical section 61 as an integrated single component or to form inlet-side diffuser 51 and inner liner 54 as an integrated single component.

Inner liner 54 includes a second end that is a free end open inside the case 53 toward bottom wall 63. Inner liner 54 has a central axis coinciding with central axis L1 of upstream-side cylindrical section 61. Accordingly, inner liner 54 and upstream-side cylindrical section 61 compose the so-called double pipe structure, and form therebetween a gap serving as a flow passage 64 with an annular shape. The annular flow passage 64 is in communication with a space defined between bottom wall 63 and a tip of inner liner 54, because the tip of inner liner 54 is apart from bottom wall 63. Annular flow passage 64 has a flow passage cross sectional area (i.e. a cross sectional area at a cross section perpendicular to central axis L1) constant in the axial direction of inner liner 54, except for a space inside the crescent portions 62a. In other words, the gap between inner liner 54 and upstream-side cylindrical section 61 is constant in width at each portion except for crescent portions 62a.

Inner liner 54 is accompanied by a plurality of (e.g. five) supporters 65 each of which is heat conductive and is interposed between a peripheral face of the tip of inner liner 54 and upstream-side cylindrical section 61. According to the first embodiment, each of supporters 65 is made of a metal mesh formed in a shape of column or disk. Accordingly, each of supporters 65 is elastically deformable and has a damping property. Supporters 65 are arranged at a plurality of (e.g. five) positions in a circumferential direction around inner liner 54 (see FIG. 4), in a vicinity of a tip edge of inner liner 54. This arrangement of supporters 65 at the plurality of positions serves to suppress vibration of the tip of inner liner 54 which is the free end.

First catalyst 55 is composed of an upstream-side ceramic member serving as a catalyst carrier and a catalytic material (e.g. a three-way catalyst) coated on and carried by the upstream-side ceramic member. The upstream-side ceramic member has a columnar shape, and includes numerous minute passages extending in the axial direction. First catalyst 55 is retained inside the inner liner 54 via a mat 67 for cushioning. In other words, first catalyst 55 is a general three-way catalyst employing a so-called monolith catalyst carrier. First catalyst 55 includes a downstream-side (i.e. outlet-side) end face 55a coinciding in position with the tip edge of inner liner 54. Similarly, first catalyst 55 includes an upstream-side (i.e. inlet-side) end face 55b coinciding in position with a base end edge of inner liner 54. Therefore, first catalyst 55 is substantially equal to inner liner 54 in entire length. The upstream-side end face 55b is positioned adjacently to inlet-side diffuser 51 formed to cover the end face 55b.

Second catalyst 56 is a particulate collection filter composed of a downstream-side ceramic member and a catalytic material (e.g. a three-way catalyst) coated on and carried by the downstream-side ceramic member. The downstream-side ceramic member has a columnar shape, and includes numerous minute passages extending in the axial direction and including ends alternately sealed. In other words, second catalyst 56 is a general gasoline particulate filter (GPF) with a catalytic material carried by a so-called sealed type monolith catalyst carrier. Alternatively, second catalyst 56 may be replaced with a particulate collection filter that does not carries a catalytic material. Second catalyst 56 is retained inside the downstream-side cylindrical section 62 via a mat 68 for cushioning. Second catalyst 56 has an entire length basically equal to a length of the straight part of downstream-side cylindrical section 62. Accordingly, second catalyst 56 includes a downstream-side (i.e. outlet-side) end face 56a positioned adjacently to outlet-side diffuser 52 formed to cover the end face 56a. Furthermore, second catalyst 56 includes an upstream-side (i.e. inlet-side) end face 56b that is open inside the case 53 at a position in a vicinity of boundaries between the straight part of downstream-side cylindrical section 62 and crescent portions 62a. In the drawings, first catalyst 55 and second catalyst 56 are exemplarily shown to be approximately equal to each other in diameter and axial length.

In detail, end face 56b of second catalyst 56 faces the peripheral face of inner liner 54 such that a half or more in diameter of end face 56b overlaps with the peripheral face of inner liner 54. Thus, as shown in FIG. 3, end face 56b includes a region projecting below the tip edge of inner liner 54 wherein the projecting region has a radial dimension less than a radius of second catalyst 56. End face 56b and the peripheral face of inner liner 54 form therebetween a gap that has a width equal to the gap serving as flow passage 64 in the double pipe structure described above (i.e. equal to a distance between inner liner 54 and upstream-side cylindrical section 61) or slightly wider than that.

In catalytic converter 26 configured as described above, exhaust gas discharged from the exhaust manifold passes first catalyst 55, and thereafter is changed in direction inside the case 53, and passes second catalyst 56, and then flows toward main catalytic converter 27 disposed under the floor of the vehicle. When internal combustion engine 1 is stopped after warming of catalysts 55 and 56, the catalysts 55 and 56 is cooled by outside air. In particular, in case of stopping the internal combustion engine 1 during vehicle traveling, catalysts 55 and 56 undergo cooling effect due to vehicle traveling wind. However, first catalyst 55 is slowed in temperature fall caused by the vehicle traveling wind during the stop of internal combustion engine 1, because of thermal insulation effect and heat retaining effect due to the gap serving as flow passage 64 between inner liner 54 and upstream-side cylindrical section 61 that compose the so-called double pipe structure. This allows catalytic effect to be exerted relatively early after operation restart of internal combustion engine 1.

On the other hand, first catalyst 55 is positioned in the upstream side, and tends to rise in temperature in case of continuous high-load operation of internal combustion engine 1. Especially, the tip of first catalyst 55, which is the free end, is likely to undergo excessive temperature rise. In case of such temperature rise in first catalyst 55, heat is transferred from first catalyst 55 to case 53 via supporters 65 that are heat conductive. This serves to suppress the tip of first catalyst 55, which is easier to rise in temperature, from undergoing the excessive temperature rise, and relax thermal deterioration of first catalyst 55.

Figure 5:
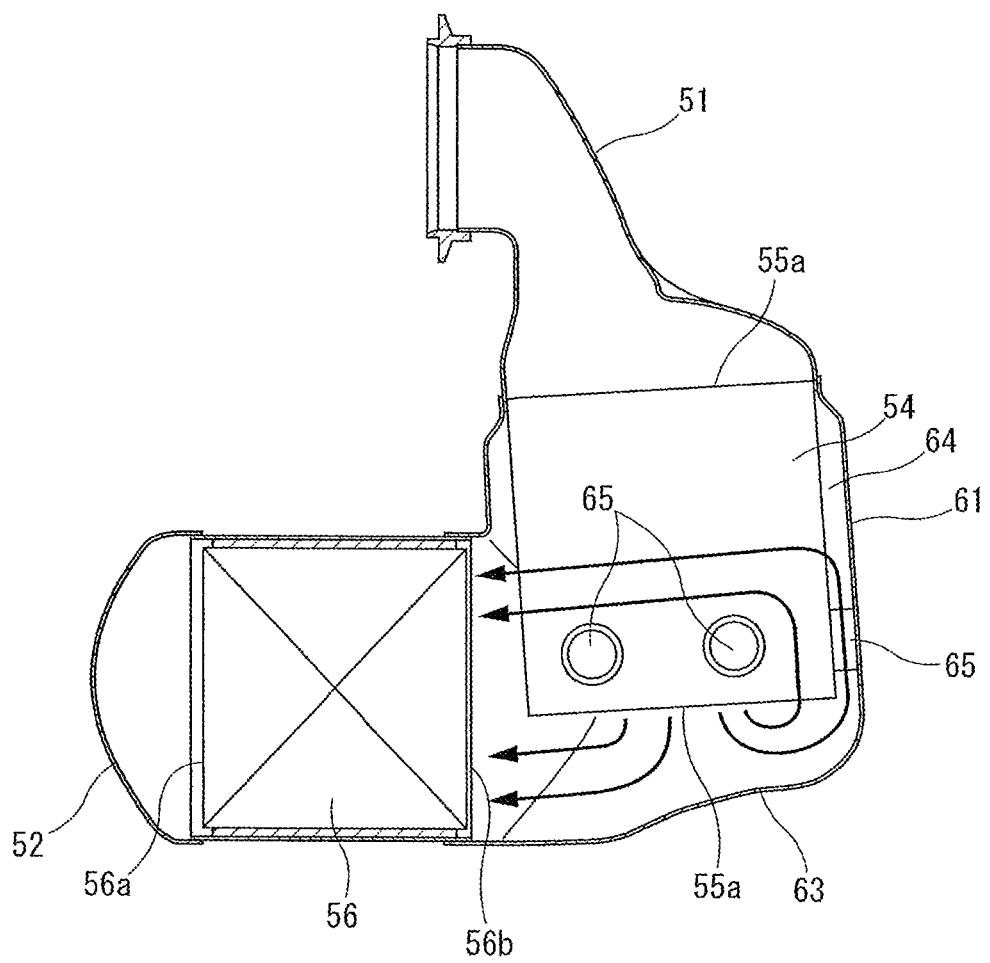
FIG. 5 is an illustrative view of exhaust flows from a first catalyst to a second catalyst.

As shown in FIG. 5 schematically illustrating flows of exhaust gas, the exhaust gas discharged from downstream-side end face 55a of first catalyst 55 partially flows along bottom wall 63 and then into second catalyst 56, while partially flowing through annular flow passage 64 between inner liner 54 and upstream-side cylindrical section 61 in the axial direction and the circumferential direction (i.e. substantially helically) and then into second catalyst 56. This allows the exhaust gas from first catalyst 55 to smoothly flow even toward a region of second catalyst 56 in which second catalyst 56 overlaps with the peripheral face of inner liner 54. This serves to guide the exhaust gas to end face 56b widely dispersively, and reduce local bias of the exhaust gas.

Thus, the exhaust gas is certainly guided also to the region of end face 56b overlapping with inner liner 54, via annular flow passage 64 in the double pipe structure. This allows the overlapping between end face 56b and inner liner 54 to be increased in amount. The exhaust gas is allowed to flow smoothly enough, even in case, as described above, that the half or more in diameter of end face 56b of second catalyst 56 overlaps with inner liner 54. According to the first embodiment, the amount of the overlapping is approximately 60% to 70% of the diameter of end face 56b. Such increase in amount of the overlapping serves to downsize catalytic converter 26 in external dimension (in particular, in vertical dimension in FIG. 3).

Annular flow passage 64 is uniform in width through an entire circumference around inner liner 54. This allows annular flow passage 64 to be increased in flow passage cross sectional area, by configuring the upstream-side cylindrical section 61 to be slightly greater in diameter than inner liner 54. This serves to establish the smooth flow of exhaust gas toward second catalyst 56, while forming the catalytic converter 26 (in particular, upstream-side cylindrical section 61) to be relatively small in external dimension.

According to the above embodiment, each of supporters 65 has a circular external shape, and thereby does not impair the flow of exhaust gas.

Figure 6:
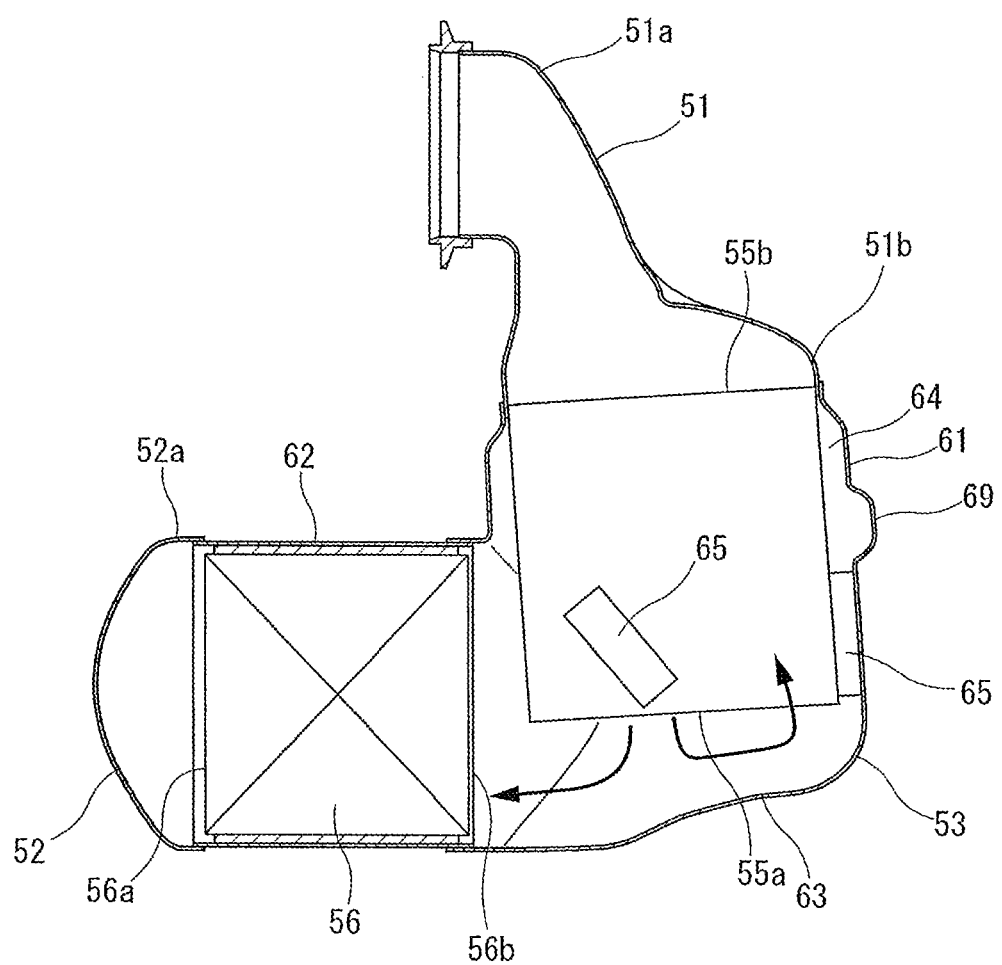
FIG. 6 is a longitudinal sectional view of the catalytic converter to exemplify a modification in supporters.

Supporters 65 are not limited to the circular ones shown in the drawings, and may be formed in various shapes. For example, FIG. 6 shows that one of supporters 65 is shaped slender and is inclined with respect to central axis L1 of upstream-side cylindrical section 61 so as to extend along the exhaust flow flowing from end face 55a of first catalyst 55 toward end face 56b of second catalyst 56 via flow passage 64. Also this one of supporters 65 is made of a heat-conductive metal mesh formed in the slender rod shape. In addition, another of supporters 65 disposed on the peripheral face in an opposite side to a side drawn in FIG. 6 is inclined symmetrically to the supporter 65 drawn in FIG. 6. Furthermore, one of supporters 65 disposed on the peripheral face in an opposite side to end face 56b of second catalyst 56 may be parallel with central axis L1.

According to the embodiment shown in FIG. 6, upstream-side cylindrical section 61 includes a bead 69 bulging outwardly, at a position slightly upstream with respect to positions of supporters 65 in the axial direction of inner liner 54. Bead 69 extends continuously in the circumferential direction around upstream-side cylindrical section 61, and is adjacent to ends of supporters 65.

Bead 69 increases annular flow passage 64 in flow passage cross sectional area (i.e. cross sectional area at a cross section perpendicular to central axis L1) partially. This serves to cancel out increase in passage resistance caused by supporters 65 disposed in flow passage 64.

Figure 4:
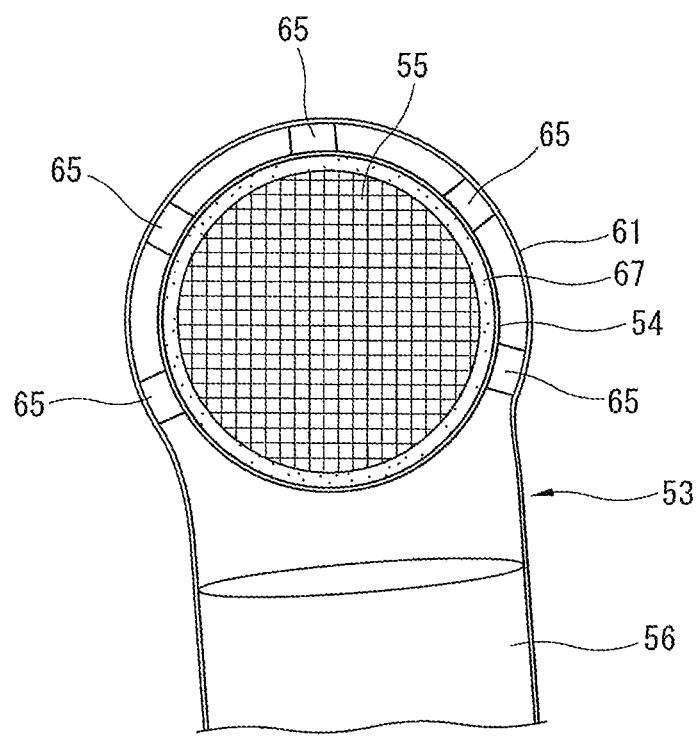
FIG. 4 is a cross sectional view of a focused part, along a line A-A shown in FIG. 3.

First catalyst 55 may be composed of a plurality of split monolith catalysts, although first catalyst 55 according to the embodiment shown in FIGS. 3 and 4 is the single monolith catalyst. For example, it is allowed to employ a front catalyst and a rear catalyst which are different from each other in characteristics, and are arranged in series, and are contained in inner liner 54.

Figure 7:
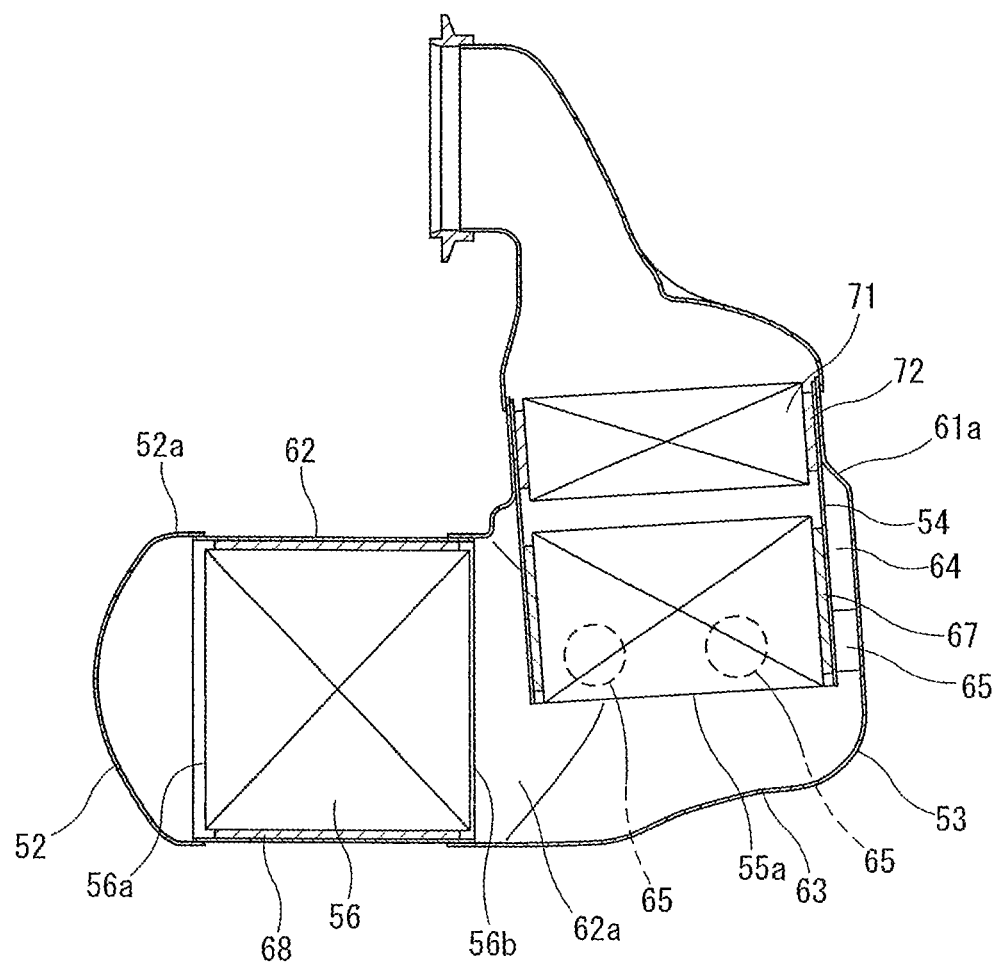
FIG. 7 is a longitudinal sectional view showing a second embodiment additionally including an electrically-heated catalyst.

FIG. 7 shows a second embodiment in which catalytic converter 26 further includes an electrically-heated catalyst (EHC) 71 between inlet-side diffuser 51 and first catalyst 55. Electrically-heated catalyst 71 has a columnar shape relatively short in axial dimension, i.e. a flat disk shape, and is disposed upstream with respect to first catalyst 55, in series with first catalyst 55. Electrically-heated catalyst 71 is, for example, a member formed by coating a metallic catalytic carrier with a catalytic material so as to generate heat in response to energization, although this may be modified variously. Electrically-heated catalyst 71 in an example in the drawing is retained inside the inner liner 54 together with first catalyst 55, via a mat 72.

Basically, electrically-heated catalyst 71 does not need a structure for thermal insulation and heat retaining, because electrically-heated catalyst 71 is structured to allow the catalyst therein to be activated by energization when being cold. Accordingly, inner liner 54 composes a so-called single pipe structure within a part containing the electrically-heated catalyst 71, wherein the part is exposed to the outside without being covered by upstream-side cylindrical section 61 defining the annular flow passage 64. In other words, taper section 61a, which is the end of upstream-side cylindrical section 61, is positioned in a vicinity of a border between electrically-heated catalyst 71 and first catalyst 55.

This serves to suppress electrically-heated catalyst 71 from undergoing needless rise in temperature, and furthermore facilitates pulling out of connectors etc. (not shown) for power supply to electrically-heated catalyst 71.

In the example in the drawing, first catalyst 55 is smaller in axial dimension than the first embodiment shown in FIGS. 3 and 4, because first catalyst 55 needs a less capacity due to addition of electrically-heated catalyst 71. However, this first catalyst 55 may be naturally replaced with one that has a size equivalent to first catalyst 55 in FIGS. 3 and 4.

The invention claimed is:

1. A catalytic converter comprising:
   an inlet-side diffuser and an outlet-side diffuser that are arranged to extend perpendicularly to each other;
   a case including an upstream-side cylindrical section and a downstream-side cylindrical section, wherein:
   the upstream-side cylindrical section includes a first end continuous with the inlet-side diffuser;

the downstream-side cylindrical section includes a first end continuous with the outlet-side diffuser;

the upstream-side cylindrical section has a central axis perpendicular to a central axis of the downstream-side cylindrical section;

the upstream-side cylindrical section includes a peripheral face that includes in a circumferential direction thereof a first part continuous with an edge of a second end of the downstream-side cylindrical section, wherein the first part is positioned in a second end of the upstream-side cylindrical section; and the peripheral face of the upstream-side cylindrical section except for the first part is continuous with the downstream-side cylindrical section via a bottom wall of the catalytic converter;

an inner liner including a first end fixed to an upstream-side edge of the upstream-side cylindrical section and a second end structured as a free end open inside the case toward the bottom wall, wherein the inner liner and the upstream-side cylindrical section define therebetween a gap serving as a flow passage and compose a double pipe structure;

an upstream-side ceramic member that has a columnar shape, and serves as a catalyst carrier or a particulate collection filter, and is retained inside the inner liner;

a downstream-side ceramic member that has a columnar shape, and serves as a catalyst carrier or a particulate collection filter, and is retained inside the downstream-side cylindrical section, wherein the downstream-side ceramic member includes an upstream-side end face facing a peripheral face of the inner liner such that a half or more in diameter of the upstream-side end face overlaps with the peripheral face of the inner liner;

supporters that are circumferentially arranged around the second end of the inner liner, wherein each of the supporters is heat conductive and is interposed between the inner liner and the upstream-side cylindrical section; and a catalytic material carried by the upstream-side ceramic member or the downstream-side ceramic member, wherein:

the flow passage in the gap between the inner liner and the upstream-side cylindrical section that compose the double pipe structure has a cross sectional area constant in an axial direction of the inner liner; and the flow passage is increased in cross sectional area partially at a position adjacent to and upstream with respect to the supporters.

2. The catalytic converter as claimed in claim 1, wherein:

the upstream-side cylindrical section is greater in diameter than the downstream-side cylindrical section; and the peripheral face of the upstream-side cylindrical section is continuous with the edge of the second end of the downstream-side cylindrical section, via a pair of crescent portions.

3. The catalytic converter as claimed in claim 1, wherein each of the supporters has a columnar or disk shape.

4. The catalytic converter as claimed in claim 1, wherein each of the supporters has a slender shape, and is inclined with respect to the central axis of the upstream-side cylindrical section.

5. The catalytic converter as claimed in claim 1, the catalytic converter further comprising:

an electrically-heated catalyst disposed between the inlet-side diffuser and the upstream-side ceramic member, wherein the catalytic converter is formed in a single pipe structure without the flow passage, within a region containing the electrically-heated catalyst.

* * * * *